(12) United States Patent  
Trantham et al.

(10) Patent No.: US 6,688,319 B2
(45) Date of Patent: Feb. 10, 2004

(54) FLOW REGULATING CONTROL VALVE AND METHOD FOR REGULATING FLUID FLOW

(75) Inventors: John M. Trantham, Hurst, TX (US); George T. Watson, III, Dallas, TX (US)

(73) Assignee: Flow Design, Inc., Dallas, TX (US)

( * ) Notice: Subject to any disclaimer, the term of this patent is extended or adjusted under 35 U.S.C. 154(b) by 63 days.

(21) Appl. No.: 10/121,106

(22) Filed: Apr. 10, 2002

(65) Prior Publication Data

US 2003/0192597 A1 Oct. 16, 2003

(51) Int. Cl.[7] .................................................. G05D 7/01
(52) U.S. Cl. ............................ 137/2; 137/501; 137/503
(58) Field of Search .................................. 137/501, 503, 137/2

(56) References Cited

U.S. PATENT DOCUMENTS

| | | |
|---|---|---|
| 2,013,974 A | 9/1935 | Somers |
| 2,139,050 A * | 12/1938 | Vickers ........................ 137/501 |
| 2,915,084 A * | 12/1959 | Taylor et al. ................ 137/501 |
| 2,967,543 A | 1/1961 | Viergutz |
| 3,424,196 A | 1/1969 | Donner |
| 3,472,275 A | 10/1969 | Castro et al. |
| 3,523,559 A | 8/1970 | Gibson |
| 3,590,861 A | 7/1971 | Chittenden et al. |
| 3,854,497 A | 12/1974 | Rosenberg |
| 3,951,162 A | 4/1976 | Wilke |
| 4,009,826 A | 3/1977 | Walker |
| 4,080,993 A | 3/1978 | Lind, Jr. |
| 4,250,915 A * | 2/1981 | Rikuta ........................ 137/501 |
| 4,375,228 A | 3/1983 | Widdowson |
| 4,440,192 A | 4/1984 | Donnelly et al. |
| 4,512,187 A | 4/1985 | Sigwardt |
| 4,513,777 A | 4/1985 | Wright |
| 4,585,206 A | 4/1986 | Itoh |
| 4,620,073 A | 10/1986 | Yokota et al. |
| 4,724,870 A | 2/1988 | Molbaek et al. |
| 4,850,461 A | 7/1989 | Rubel |
| 4,926,704 A | 5/1990 | Survil et al. |

(List continued on next page.)

FOREIGN PATENT DOCUMENTS

| | | |
|---|---|---|
| EP | 0 249454 B1 | 10/1987 |
| EP | 0 395903 A1 | 7/1990 |
| EP | 0 542285 B1 | 12/1992 |

Primary Examiner—Stephen M. Hepperle
(74) Attorney, Agent, or Firm—Baker Bôtts, L.L.P.

(57) ABSTRACT

According to one aspect of the invention, a fluid regulating control valve includes a housing having an upstream region and a downstream region and having a control orifice formed therein adjacent the downstream region and a piston slidably disposed within the housing. The piston has a fluid passage defining an intermediate region disposed between the upstream region and the downstream region and an edge adjacent the downstream region. The valve also includes an elastic member disposed within the housing for opposing translation of the piston within the housing and a throttling element adjacent the upstream region. The throttling element has a throttling surface adjacent the edge of the piston, in which the throttling surface and the edge define a throttling orifice therebetween. The valve further includes an equalization aperture formed in the housing to allow a fluid in the downstream region to enter an equalization chamber defined by a region between an inside surface of the housing and an outside surface of the piston.

20 Claims, 4 Drawing Sheets

U.S. PATENT DOCUMENTS

| | | |
|---|---|---|
| 5,020,774 A | 6/1991 | Christianson |
| 5,148,830 A | 9/1992 | Liu |
| 5,161,577 A | 11/1992 | Stephenson |
| 5,174,330 A | 12/1992 | Golestan et al. |
| 5,249,599 A | 10/1993 | Haynes et al. |
| 5,265,643 A | 11/1993 | Golestan et al. |
| 5,271,430 A | 12/1993 | Muruyama et al. |
| 5,383,489 A | 1/1995 | Golestan et al. |
| 5,385,328 A | 1/1995 | Hofmann |
| 5,427,144 A | 6/1995 | Teets et al. |
| 5,529,090 A | 6/1996 | Golestan et al. |
| 5,533,549 A | 7/1996 | Sherman |
| 5,806,557 A * | 9/1998 | Helge .................. 137/501 |
| 5,971,012 A | 10/1999 | Skoglund |
| 5,979,495 A | 11/1999 | Taube et al. |
| 5,996,615 A | 12/1999 | Zuegner et al. |
| 6,196,259 B1 | 3/2001 | Weber |
| 6,276,397 B1 | 8/2001 | Weber et al. |

\* cited by examiner

FLOW REGULATING CONTROL VALVE AND METHOD FOR REGULATING FLUID FLOW

TECHNICAL FIELD OF THE INVENTION

This invention relates generally to the field of fluid flow and, more specifically, to a flow regulating control valve and method for regulating fluid flow.

BACKGROUND OF THE INVENTION

Fluid valves are used extensively in industry for many applications. An example is the use of fluid valves in heat exchanging systems in buildings for heating or cooling purposes. In many applications, it is often desirable to maintain a constant flow rate through a fluid valve despite fluctuations that may occur in the pressure of the upstream or downstream fluid. It is also desirable in some instances to be able to adjust the flow rate through a valve.

Some prior valves achieve a constant flow by attempting to maintain a constant differential pressure across a control orifice by allowing the differential pressure to act on a piston opposed by an elastic member of nearly constant force. The motion of said piston controls the size of a throttling restriction, which is placed downstream of the control orifice. A consequence of this is that an edge of the piston adjacent the throttling restriction is acted upon by the downstream pressure, which is lower than either of the pressures affecting the intended regulation. This lower pressure tends to cause the throttling restriction to close further than it should for proper regulation, resulting in a lower flow than intended. The dynamic forces arising from the flow of the fluid tend to further lower the pressure acting on the throttling restriction due to Bernoulli's principle. The error becomes greater as the total pressure differential across the device increases. This phenomenon is referred to as "sag" and various attempts have been made to limit its effect. Such previous attempts, however, have worked correctly only for a particular flow rate, as is the case of the special pattern of openings disclosed in U.S. Pat. No. 4,080,993 entitled In-Line Flow-Control Valve, to Charles F. Lind.

SUMMARY OF THE INVENTION

According to one aspect of the invention, a fluid regulating control valve includes a housing having an upstream region and a downstream region and having a control orifice formed therein adjacent the downstream region and a piston slidably disposed within the housing. The piston has a fluid passage defining an intermediate region disposed between the upstream region and the downstream region and an edge adjacent the upstream region. The valve also includes an elastic member disposed within the housing for opposing translation of the piston within the housing and a throttling element adjacent the upstream region. The throttling element has a throttling surface adjacent the edge of the piston, in which the throttling surface and the edge define a throttling orifice therebetween. The valve further includes an equalization aperture formed in the housing to allow a fluid in the downstream region to enter an equalization chamber defined by a region between an inside surface of the housing and an outside surface of the piston.

According to another aspect of the invention, a fluid regulating control valve for controlling a flow of a fluid includes a housing having an upstream region, a downstream region, and an intermediate region disposed between the upstream region and the downstream region. The valve is formed with a throttling orifice disposed between the upstream region and the intermediate region. The throttling orifice is adapted to dynamically change in size in response to a change in a pressure of the fluid in the upstream region. The valve is also formed with a control orifice disposed between the intermediate region and the downstream region. The control orifice is set to a predetermined size to regulate a flow rate of the fluid.

Embodiments of the invention provide a number of technical advantages. Embodiments of the invention may include all, some, or none of these advantages. For example, one embodiment of the invention allows improved flow regulation over a wide range of flows for a single device by placing a throttling element upstream of a control orifice and balancing the dynamic forces arising from the flow against the forces arising from the higher pressure. By throttling against a pressure which is higher, rather than lower, than the intermediate pressure, the device has a tendency to be disturbed to a more open position, rather than a more closed position. This tendency may then be balanced by the pressure reductions resulting from the fluid velocity to achieve a constant flow rate. By achieving this balance, the throttling edge is not required to be thin, as was the case with many prior devices. Avoiding this thin edge improves the durability and manufacturability of the device.

The present invention also reduces the risk of cavitation. This is because the larger pressure drop across the throttling portion occurs before the smaller pressure drop across the control orifice.

Other technical advantages are readily apparent to one skilled in the art from the following figures, descriptions, and claims.

BRIEF DESCRIPTION OF THE DRAWINGS

For a more complete understanding of the invention, and for further features and advantages, reference is now made to the following description, taken in conjunction with the accompanying drawings, in which.

DETAILED DESCRIPTION OF EXAMPLE EMBODIMENTS OF THE INVENTION

Example embodiments of the present invention and their advantages are best understood by referring now to FIGS. 1 through 5B of the drawings, in which like numerals refer to like parts.

Figure 1:
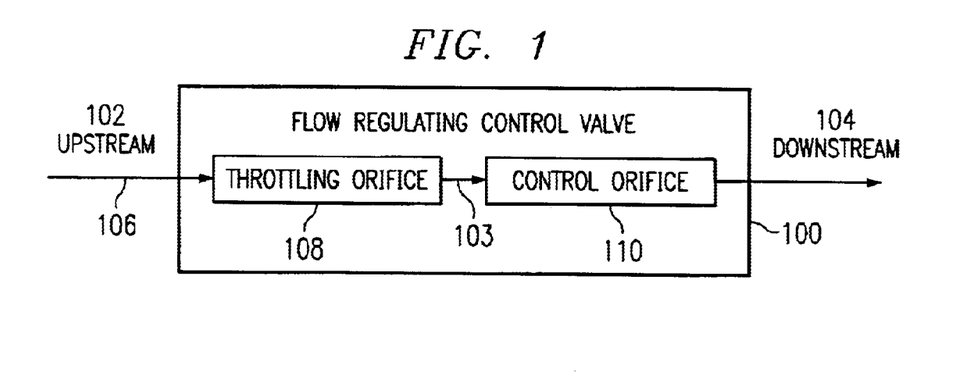
FIG. 1 is a block diagram of a flow regulating control valve having a throttling orifice positioned upstream from a control orifice according to one embodiment of the present invention.

FIG. 1 is a block diagram of a flow regulating control valve 100 according to one embodiment of the present invention. Control valve 100 receives fluid from an upstream region 102 and transports it to a downstream region 104. Control valve includes a throttling orifice 108, a control orifice 110, and an intermediate region 103 disposed between the throttling orifice 108 and control orifice 110. Although not explicitly illustrated in FIG. 1, control valve 100 includes other components, as described in greater detail below. Any suitable fluid flows in the direction of arrow 106 from upstream region 102 to downstream region 104.

According to the teachings of the present invention, throttling orifice 108 is positioned upstream from control orifice 110 as opposed to prior control valves that have the control orifice upstream from the throttling orifice. Both throttling orifice 108 and control orifice 110 are described in greater detail below. However, generally, throttling orifice 108 is adapted to dynamically change in size in response to a change in a pressure of a fluid in upstream region 102, and control orifice 110 is set to a predetermined size to regulate a flow rate of the fluid flowing through control valve 100. A reduction in pressure due to velocity of fluid through throttling orifice 108 may be used to balance the higher pressure in upstream region 102. Having throttling orifice 108 positioned upstream from control orifice 110 addresses the deleterious effects of the pressure of the fluid in downstream region 104 on the control of the flow rate of the fluid, as described below. Such an effect is known conventionally as "sag." Some embodiments of the present invention may also reduce the risk of cavitation because a larger pressure drop across throttling orifice 108 occurs before a smaller pressure drop across control orifice 110.

One embodiment of control valve 100 is described in detail below in conjunction with FIGS. 2A and 2B, while another embodiment of control valve 100 is described in detail below in conjunction with FIGS. 3A and 3B.

Figure 2A:
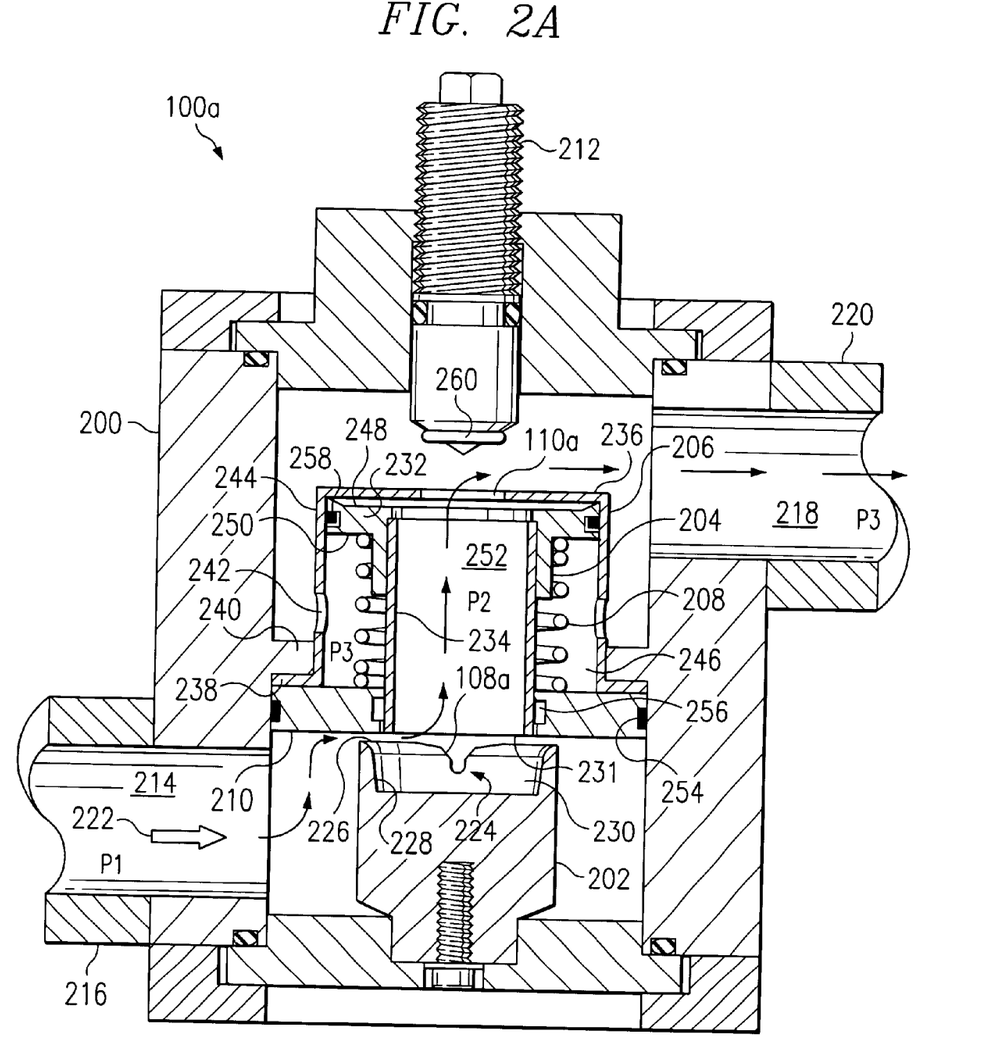
FIG. 2A is a cross-sectional view of one embodiment of the flow regulating control valve in FIG. 1 illustrating a piston in a first position.

FIG. 2A is a cross-sectional view of one embodiment of control valve 100, designated 100a. In the illustrated embodiment, control valve 100a includes a housing 200, a throttling element 202, a piston 204, a cap 206, an elastic member 208, a retaining ring 210, and an adjustable element 212. Unless otherwise noted below, all components of control valve 100a are formed from any material suitable for control valves, such as brass, stainless steel, plastic, or other suitable material.

Housing 200 is shown in FIG. 2A to be generally rectangular in longitudinal cross-section; however, housing 200 may take on other configurations. Housing 200 has an upstream region 214 that couples to a pipe 216 and a downstream region 218 couples to a pipe 220. Both pipe 216 and pipe 220 may be any suitable conduits adapted to transport fluid. A fluid flows through housing 200 from upstream region 214 to downstream region 218, as denoted by arrow 222.

Throttling element 202 is coupled to housing 200 adjacent upstream region 214 in any suitable manner. Details of one embodiment of throttling element 202 are described below in conjunction with FIGS. 5A and 5B. However, generally, throttling element 202 has a throttling surface 224 defined by an edge 226 of throttling element 202 and an inclined surface 228 of a cavity 230 formed in an end of throttling element 202. An example of throttling orifice 108, 108a, is defined by throttling surface 224 and an edge 231 of piston 204.

Piston 204 is shown in FIG. 2A to have a flange portion 232 and a stem portion 234 that includes edge 231. Flange portion 232 and stem portion 234 may be integral or may be separate portions of piston 204 coupled together in any suitable manner. Piston 204 is slidably disposed within cap 206 and is illustrated in a first position, in which piston 204 is restricted from moving toward a control orifice 110a because of a topside 236 of cap 206. Piston 204 is kept in this position by elastic member 208, which is described below. Generally, an inside diameter of piston 204 is chosen to give an average velocity of approximately 5 feet per second for the maximum fluid flow; however, other suitable diameters may be utilized. In a particular embodiment, piston 204 has a diameter, d, that follows the relationship:

$$d = \sqrt{\frac{4 * Q_{max}}{\pi * 5 \frac{ft}{sec}}}$$

where $Q_{max}$ is the maximum flow rate through control valve 100. Flange portion 232, in one embodiment, has a diameter approximately equal to 1.7 times the inside diameter of piston 204; however, other suitable diameters may be utilized.

Cap 206 is disposed within housing 200 and is shown to be secured therein by having a flange 238 pinched in between a lip 240 of housing 200 and retaining ring 210. Cap 206 may, however, be coupled to housing 200 in other suitable manners. Cap 206 includes control orifice 110a formed in topside 236 and a plurality of equalization apertures 242 formed in a sidewall 244. As described in greater detail below, equalization apertures 242 allow fluid in downstream region 218 to enter into an equalization chamber 246. Equalization chamber 246 is defined by an annular space formed by an inside surface of cap 206 and an outside surface of piston 204. Fluid in an intermediate region 252 is prevented from entering equalization chamber 246 by a piston ring 258 coupled to a perimeter of flange portion 232 of piston 204. Piston ring 258 may be any suitable seal, such as an o-ring or a square gasket formed from a fluorocarbon such as Teflon®. Cap 206 may have any suitable shape; however, an inside surface of cap 206 should match up with a perimeter of flange 232 of piston 204 to facilitate the sliding of piston 204 therein.

Elastic member 208 is any suitable elastic member, such as a spring. Elastic member 208 provides a force which urges piston 204 toward downstream region 218. This force is opposed by the difference in pressures acting on a top side 248 and a bottom side 250 of flange portion 232. From this it may be seen that if all other forces are neglected, elastic member 208, together with the area of flange portion 232 of piston 204, establishes the regulated pressure across control orifice 110a. Elastic member 208 is, therefore, chosen to provide a force that is nearly constant over the travel of piston 204. The action of other forces are described in greater detail below.

Retaining ring 210 functions to retain cap 206 within housing 200. Retaining ring 210 has a seal 254 on a perimeter thereof to prevent fluid from seeping between the perimeter of retaining ring 210 and housing 200 and into equalization chamber 246. In addition, retaining ring 210 has another seal 256 that acts to prevent fluid from seeping between an outside surface of piston 204 and an inside surface of retaining ring 210 into equalization chamber 246. Seal 256 is also chosen such that it allows piston 204 to translate.

Adjustable element 212 functions to selectively constrict control orifice 110a so that the flow rate of fluid through housing 200 is set. As illustrated, adjustable element 212 is threadably engaged with housing 200. However, adjustable element 212 may be coupled to housing 200 in other suitable manners. Adjustable element 212 is adapted to translate towards and away from control orifice 110a to either constrict or open up control orifice 110a. A gasket 260 may be coupled to an end of adjustable element 212 to prevent leakage through control orifice 110a if no flow rate is desired.

In operation, a fluid flows through housing 200 in the direction indicated by arrow 222. The fluid in upstream region 214 is at a certain pressure denoted as P1. As indicated by the arrows, fluid enters into intermediate region 252 via throttling orifice 108a. The fluid pressure inside intermediate region 252, denoted as P2, is at a lower pressure than P1. The fluid then travels through intermediate region 252 and enters downstream region 218 via control orifice 110a. In downstream region 218, the fluid is at a pressure P3, which is less than P2. The fluid in downstream region 218 also enters equalization chamber 246 via equalization apertures 242, as described above. This means that the pressure of the fluid inside equalization chamber 246 is also at pressure P3. Accordingly, the pressure differential across control orifice 110a is P2–P3. This pressure differential is the same pressure differential that is across flange portion 232 of piston 204 (P2 acts on top side 248 and P3 acts on bottom side 250). Having the differential pressure across control orifice 110a equal to the pressure differential across flange portion 232 of piston 204 provides, among other advantages, stability to control valve 100a.

Variations in the pressure of the fluid in upstream region 214 or downstream region 218 may cause changes in the flow rate of the fluid. If the flow rate is greater than the desired setting, then the differential pressure across control orifice 110a is also greater than the value required for equilibrium. This, in turn, results in the force imposed on piston 204 by the differential pressure to be greater than the force supplied by resilient member 208 so that piston 204 begins to move toward upstream region 214. This movement continues until throttling orifice 108a has closed sufficiently that the forces induced on piston 204 by the pressure of the fluid again match the force supplied by resilient member 208. If the disturbance forces are properly balanced as described below, this means that the differential pressure across control orifice 110a, and therefore the flow rate, has returned to its desired value within acceptable limits. This is best illustrated in FIG. 2B.

Figure 2B:
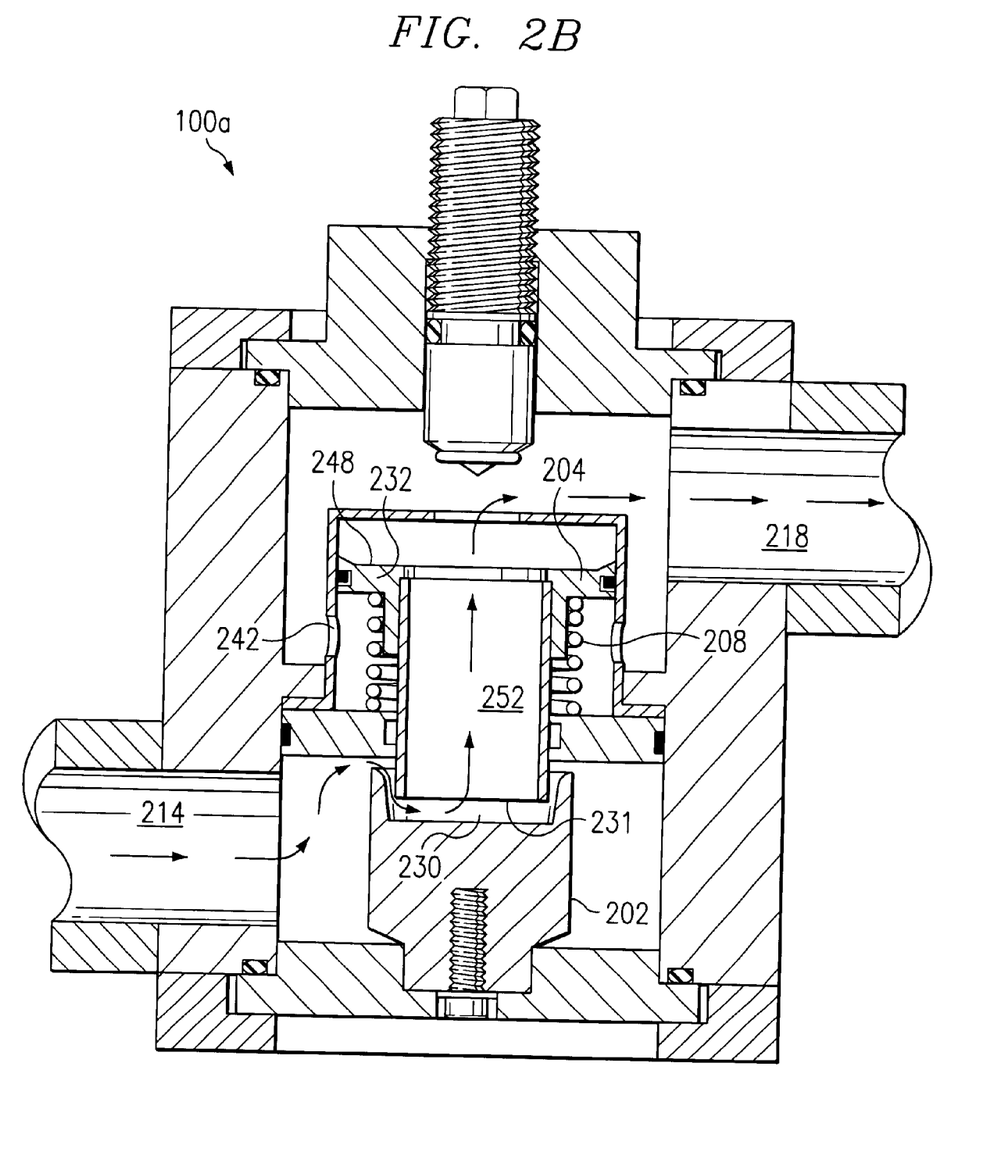
FIG. 2B is a cross-sectional view of the flow regulating control valve in FIG. 2A illustrating the piston in a second position.

FIG. 2B is a cross-sectional view of control valve 100a illustrating piston 204 in a second position. This second position is caused by an increase in P1, as described above. As illustrated in FIG. 2B, elastic member 208 is in a compressed position. Edge 231 of piston 204 has entered into cavity 230 of throttling element 202. Piston 204 does this to constrict throttling orifice 108a to reduce or decrease the flow rate through throttling orifice 108a into intermediate region 252. At this point, when P1 starts to decrease, then piston 204 translates back toward downstream region 218 to maintain the flow rate through control orifice 110a.

As mentioned above, one important technical advantage of the present invention is that control valve 100a addresses the deleterious effects from sag. Sag is caused by fluid pressure at the downstream side of the valve pulling on a moveable portion of the valve, which tends to close the throttling orifice and decrease the flow rate through the valve. The present invention addresses this by reversing the order of throttling orifice 108a and control orifice 110a by putting throttling orifice 108a upstream from control orifice 110a. In this manner, the overall pressure gradient from P1 to P2 tends to disturb piston 204 towards downstream region 218, while the Bernoulli forces generated by the fluid flowing through throttling orifice 108a acts the other way. Thus, artfully employing the Bernoulli forces in the system neutralizes the pressure gradient. This advantage is illustrated best in FIG. 4 below. In prior systems, both the pressure gradient and the Bernoulli forces tended to cause sag, thus making such a neutralization impossible. Prior systems attempted to counter sag with leakage or non-constant spring force. Before discussing FIG. 4, FIGS. 3A and 3B show an alternative embodiment of control valve 100 of the present invention.

Figure 3A:
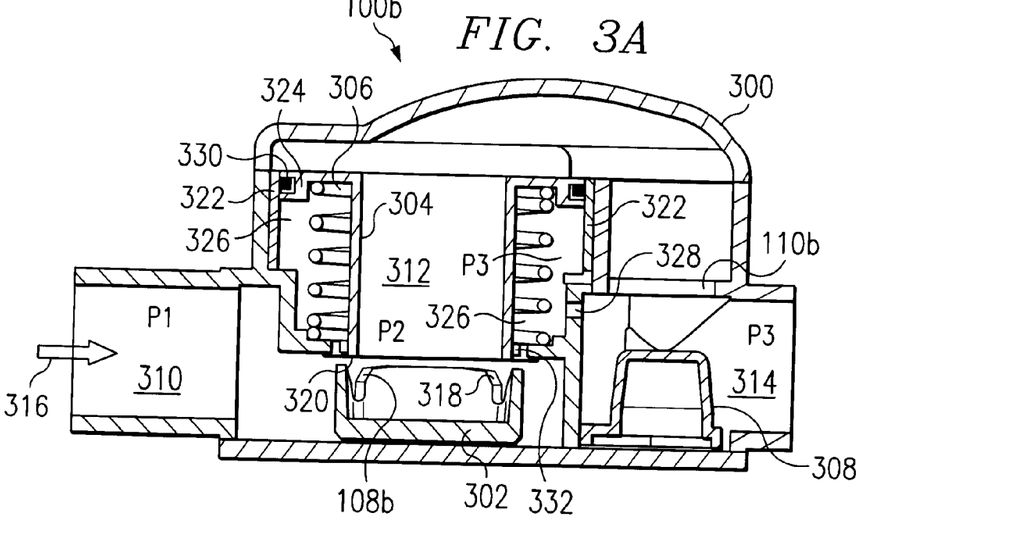
FIG. 3A is a cross-sectional view of another embodiment of the flow regulating control valve in FIG. 1 illustrating a piston in a first position.
Figure 4:
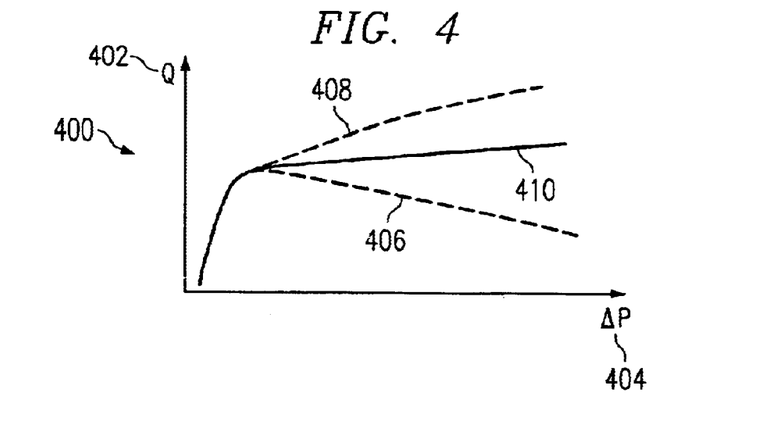
FIG. 4 is a graph of flow rate versus pressure differential according to one embodiment of the present invention.

FIG. 3A is a cross-sectional view of another embodiment of control valve 100, designated 100b. Control valve 100b includes a housing 300, a throttling element 302, a piston 304, an elastic member 306 and an adjustment element 308.

Housing 300, which may be any suitable shape, has an upstream region 310, an intermediate region 312, and a downstream region 314 that defines a path for a fluid flowing therethrough in a direction as denoted by arrow 316. Control valve 100b is similar to control valve 100a in FIGS. 2A and 2B; however, FIG. 3A does not have a cap that includes a control orifice. In the embodiment of FIG. 3A, control orifice 110b is formed in housing 300 adjacent downstream region 314, as illustrated.

Throttling element 302 is similar to the throttling element 202 in FIG. 2A and is coupled to housing 300 in any suitable manner. Throttling element 302 has a throttling surface 318 that works in conjunction with an edge 320 of piston 304 to define throttling orifice 108b. As illustrated, edge 320 of piston 304 is square. In prior systems, the edge of the piston had to be contoured in some manner to combat the effects of sag. However, because the present invention positions throttling orifice 108b before control orifice 110b, sag is not as much of a problem. Accordingly, edge 320 of piston 304 does not have to be contoured in any manner, which saves considerable manufacturing costs.

Piston 304 is slidably disposed within housing 300 along a wall 322. Piston 304 has a flange portion 324, a perimeter of which slides along wall 322, and a stem portion 326 that extends from flange portion 324 down to edge 320. Flange portion 232 and stem portion 234 may be integral or may be separate portions of piston 204 coupled together in any suitable manner. As in the case of piston 204 above (FIG. 2A), piston 304 may have any suitable diameter. Elastic member 306, which may be any suitable elastic member, such as a spring, functions the same way that elastic member 208 functioned in FIG. 2A. Elastic member 306 is disposed on the outside of piston 304.

An equalization chamber 326 receives fluid from downstream region 314 via one or more equalization apertures 328 as shown. There exists a piston ring 330 around the perimeter of flange 324 to prevent fluid from leaking from equalization chamber 326 to intermediate region 312. Similarly, control valve 100b also includes a seal 332 around an upstream end of piston 304 to prevent fluid from leaking into equalization chamber 326 from upstream region 310.

Adjustment element 308 functions to control the flow rate of the fluid exiting control orifice 110b by translating adjustment element 308 into or away from control orifice 110b.

The operation of control 100b is similar to that of control valve 110a. As such, a fluid enters upstream region 310 and travels through throttling orifice 108b into intermediate region 312 before exiting control orifice 110b into downstream region 314, as denoted by the arrows. Once the pressure, P1, in upstream region 310 reaches a certain level, then P2 also increases. Piston 304 then starts translating toward upstream region 310. This acts to constrict throttling orifice 108b to reduce the flow rate of the fluid. This is best illustrated in FIG. 3B.

Figure 3B:
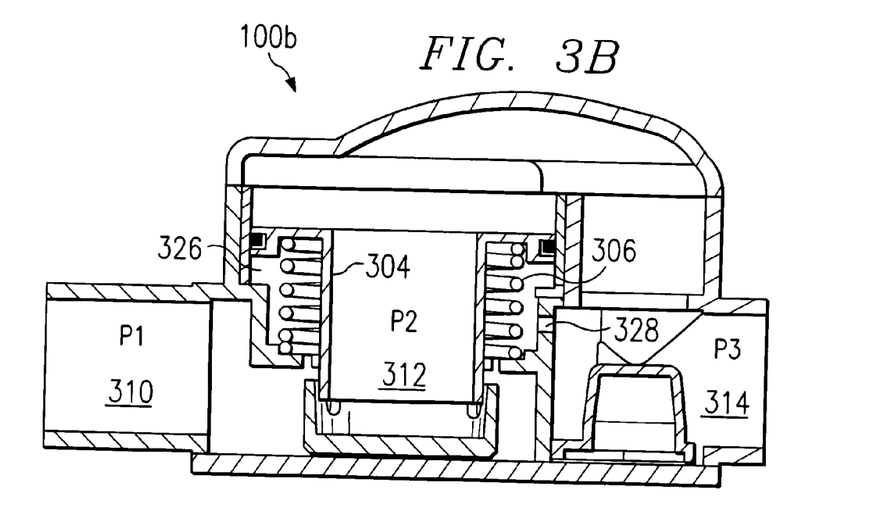
FIG. 3B is a cross-sectional view of the flow regulating control valve in FIG. 3A illustrating the piston in a second position.

FIG. 3B shows piston 304 translated toward upstream region 310 to constrict the flow of fluid through throttling orifice 108b. Elastic member 306 is shown in a compressed position. As P1 starts to decrease, piston 304 translates upward and acts to open throttling orifice 108b so that the flow rate of the fluid may increase to maintain the flow rate of the fluid through control valve 100b.

As mentioned above, one technical advantage of the present invention is that it addresses the deleterious effects of sag. This is illustrated by a graph 400 shown in FIG. 4. Graph 400 graphs a flow rate 402 versus a pressure differential 404 across control valve 100. The dotted line denoted by reference numeral 406 shows the phenomenon known as sag that occurs in prior systems. As illustrated, as the pressure differential across a control valve increases as the flow rate decreases. This provides for a very unstable control valve and may produce pulses in the control valve. A graph of flow rate versus pressure differential according to one embodiment of the present invention is denoted by broken line 408. As the pressure differential 404 increases the flow rate increases. This provides for a much more stable control valve 100. An ideal situation is denoted by curve 410. This illustrates that as the differential pressure 404 increases, the flow rate 402 is kept at a very steady rate. It is desirable to get as close to "ideal" curve 410 as possible. This is why the present invention uses the Bernoulli forces created by the fluid flow to counteract the pressure differential across throttling orifice 108. An important advantage of one embodiment of the present invention is that if the velocity induced forces (i.e., the Bernoulli forces) and the fluid pressure in the upstream region are matched in a given position for one flow, they remain matched at that position for a wide variety of flows.

Figure 5A:
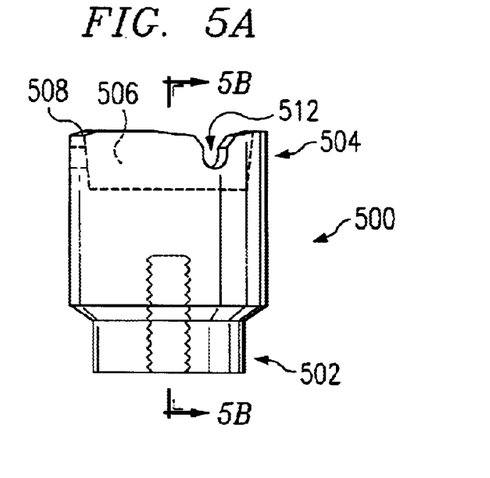
FIG. 5A is an elevation view of a throttling element according to one embodiment of the present invention.

FIG. 5A is an elevation view of a throttling element 500 according to one embodiment of the present invention. Throttling element 500 is an example of one that may be used as throttling element 202 in control valve 100a or throttling element 302 in control valve 100b.

Throttling element 500 includes a first end 502 and a second end 504. First end 502 is the end of throttling element 500 that couples to a housing of control valve 100. As described above, throttling element 500 may be coupled to a housing in any suitable manner. Second end 504 has a cavity 506 formed therein, and an edge 508. An incline surface 510 of cavity 506 and edge 508 define throttling orifice 108 of control valve 100.

Figure 5B:
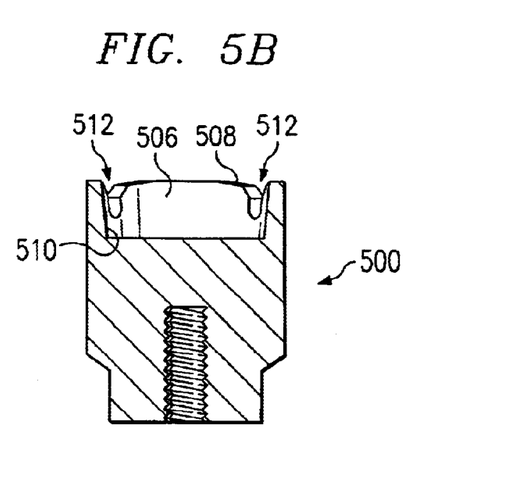
FIG. 5B is cross-section view of the throttling element of FIG. 5A.

As illustrated in FIGS. 5A and 5B, edge 508 includes three ports 512. Ports 512 may have any suitable shape; however, the shape of ports 512 is preferably determined by experimentation such that the fluid flow rate through control valve 100 is maintained as closed to the desired flow rate as possible. Incline surface 510 is also chosen to maximize the efficiency of control valve 100 when trying to maintain the fluid flow rate. In one embodiment, incline surface 510 is inclined at an angle of approximately six degrees; however, other suitable angles may be utilized. Edge 508 with ports 512 functions to handle relatively high flow rate, while incline surface 510 functions to handle relatively low flow rates. Again, the combination of edge 508 and incline surface 510 is preferably determined experimentally by what is best to obtain the most constant flow rate as the pressure differential across control valve 100 increases. In other words, the combination of edge 508 and incline surface 510 is determined to obtain curve 410 (FIG. 4). Other shapes other than ports 512 may be utilized on edge 508.

In a particular embodiment of the present invention, a configuration of ports 512 that works well to balance the forces from the flowing fluid follows the following equation:

$$W(x) = \frac{0.0004318 d}{1.0055 e^{-0.025x} - 1}$$

where d is the diameter of the piston, W is the width of each of the three ports 512, and x is the distance from the edge of the piston to its fully closed position (i.e., the position of the edge of the piston if it were touching the inclined surface of the cavity of the throttling element). The maximum of x is approximately 0.28d, with the throttling surface being truncated at the point where the width of the three ports 512 equal approximately one third of the perimeter. As described above, a preferred size for d follows the relationship:

$$d = \sqrt{\frac{4 * Q_{\max}}{\pi * 5 \frac{\text{ft}}{\text{sec}}}}$$

Although example embodiments of the invention and their advantages are described in detail, a person skilled in the art could make various alterations, additions, and/or omissions without departing from the spirit and scope of the present invention as defined by the appended claims.

What is claimed is:

1. A fluid regulating control valve, comprising:
   a housing having an upstream region and a downstream region and having a control orifice formed therein adjacent the downstream region;
   a piston slidably disposed within the housing, the piston having a fluid passage defining an intermediate region disposed between the upstream region and the downstream region, the piston also having an edge adjacent the upstream region;
   an elastic member disposed within the housing for opposing translation of the piston within the housing;
   a throttling element adjacent the upstream region, the throttling element having a throttling surface adjacent the edge of the piston, the throttling surface and the edge defining a throttling orifice therebetween; and
   an equalization aperture formed in the housing to allow a fluid in the downstream region to enter an equalization chamber defined by a region between an inside surface of the housing and an outside surface of the piston.

2. The fluid regulating control valve of claim 1, wherein the equalization aperture is formed in a wall of the housing, the wall disposed between the equalization chamber and the downstream region.

3. The fluid regulating control valve of claim 1, further comprising a seal disposed between the housing and a perimeter of the piston to reduce leakage of the fluid from the upstream region to the equalization chamber.

4. The fluid regulating control valve of claim 1, further comprising a square piston ring disposed between a perimeter of the piston and an inner surface of the housing for reducing leakage of the fluid therebetween, the piston ring formed from a fluorocarbon.

5. The fluid regulating control valve of claim 1, further comprising an adjustment element coupled to the housing for selectively constricting the control orifice.

6. The fluid regulating control valve of claim 1, wherein the piston comprises a flange portion and a stem portion, the flange portion having a first side exposed to the intermediate region, a second side exposed to the equalization chamber, and a perimeter slidably engaged with an inside surface of the housing.

7. The fluid regulating control valve of claim 1, wherein the throttling element has a cavity formed in an end thereof, the cavity having an inclined sidewall, and wherein the throttling surface is defined by an edge of the throttling element and the sidewall.

8. The fluid regulating control valve of claim 7, wherein the edge has three ports formed therein, the three ports configured to follow the following equation:

$$W(x) = \frac{0.0004318d}{1.0055e^{-0.025x} - 1}$$

where d is the diameter of the piston, W is the width of each of the three ports, and x is a distance from the edge of the piston to a fully closed position defined by a position of the piston in which the edge of the piston touches the inclined sidewall of the cavity of the throttling element.

9. The fluid regulating control valve of claim 1, wherein the edge of the piston is square.

10. The fluid regulating control valve of claim 1, wherein a size of the throttling orifice changes as the piston translates in response to a change in a pressure of the fluid in the upstream region.

11. The fluid regulating control valve of claim 10, wherein the size of the throttling orifice decreases as the piston translates toward the upstream region in response to an increase in the pressure of the fluid in the upstream region.

12. The fluid regulating control valve of claim 10, wherein a size of the throttling orifice increases as the piston translates toward the downstream region in response to a decrease in the pressure of the fluid in the upstream region.

13. A fluid regulating control valve, comprising:
   a housing having an upstream region and a downstream region and having a control orifice formed therein, the control orifice adjacent the downstream region;
   a piston slidably disposed within the housing, the piston comprising a flange portion and a stem portion, the stem portion having a fluid passage defining an intermediate region disposed between the upstream region and the downstream region, the stem portion also having an edge adjacent the upstream region, the flange portion having a first side exposed to the intermediate region and a perimeter slidably engaged with an inside surface of the housing;
   an elastic member disposed within the housing for opposing translation of the piston within the housing;
   a throttling element adjacent the upstream region, the throttling element having a throttling surface adjacent the edge of the piston, the throttling surface and the edge defining a throttling orifice therebetween;
   an equalization aperture formed in the housing to allow a fluid in the downstream region to enter an equalization chamber defined by a region between an inside surface of the housing and an outside surface of the piston;
   a seal disposed between the housing and a perimeter of the piston to reduce leakage of the fluid from the upstream region to the equalization chamber;
   a piston ring disposed between a perimeter of the piston and an inner surface of the housing for reducing leakage of the fluid therebetween; and
   wherein a size of the throttling orifice changes as the piston translates in response to a change in a pressure of the fluid in the upstream region.

14. The fluid regulating control valve of claim 13, wherein the piston ring is formed from a fluorocarbon.

15. The fluid regulating control valve of claim 13, further comprising an adjustment element coupled to the housing for selectively constricting the control orifice.

16. The fluid regulating control valve of claim 13, wherein the throttling element has a cavity formed in an end thereof, the cavity having an inclined sidewall, and wherein the throttling surface is defined by an edge of the throttling element and the sidewall.

17. The fluid regulating control valve of claim 16, wherein the edge has three ports formed therein, the three ports configured to follow the following equation:

$$W(x) = \frac{0.0004318d}{1.0055e^{-0.025x} - 1}$$

where d is the diameter of the piston, W is the width of each of the three ports, and x is a distance from the edge of the piston to a fully closed position defined by a position of the piston in which the edge of the piston touches the inclined sidewall of the cavity of the throttling element.

18. The fluid regulating control valve of claim 13, wherein the edge of the piston is square.

19. The fluid regulating control valve of claim 13, wherein the size of the throttling orifice decreases as the piston translates toward the upstream region in response to an increase in the pressure of the fluid in the upstream region.

20. The fluid regulating control valve of claim 13, wherein a size of the throttling orifice increases as the piston translates toward the downstream region in response to a decrease in the pressure of the fluid in the upstream region.

* * * * *